FREQUENCY SHIFT TELEPRINTER

Filed Dec. 19, 1950

5 Sheets-Sheet 1

Inventor:
Charles A. Higgins
BY Taylor, Cpelli & Jurick
Attorney.

Sept. 29, 1953 C. A. HIGGINS 2,654,025

FREQUENCY SHIFT TELEPRINTER

Filed Dec. 19, 1950 5 Sheets-Sheet 2

Inventor:
Charles A. Higgins
BY Taylor, Capelli & Zwick
Attorneys.

Sept. 29, 1953 C. A. HIGGINS 2,654,025

FREQUENCY SHIFT TELEPRINTER

Filed Dec. 19, 1950 5 Sheets-Sheet 3

Inventor
Charles A. Higgins
BY Gaylor Cfelli & Jurick
Attorney.

Sept. 29, 1953

C. A. HIGGINS 2,654,025

FREQUENCY SHIFT TELEPRINTER

Filed Dec. 19, 1950

5 Sheets-Sheet 4

Inventor:
Charles A. Higgins
BY Gaylor Apelli & Juick
Attorney.

Sept. 29, 1953 C. A. HIGGINS 2,654,025

FREQUENCY SHIFT TELEPRINTER

Filed Dec. 19, 1950 5 Sheets-Sheet 5

Inventor:
Charles A. Higgins
BY Gaylor Cifelli & Jurick
Attorneys.

Patented Sept. 29, 1953

2,654,025

UNITED STATES PATENT OFFICE 2,654,025

FREQUENCY SHIFT TELEPRINTER

Charles A. Higgins, Boonton, N. J., assignor to Radio Frequency Laboratories, Inc., Boonton, N. J., a corporation of New Jersey Application December 19, 1950, Serial No. 201,622

8 Claims. (Cl. 250—8)

This invention relates to a system for receiving and translating radio-transmitted signals and more particularly to a novel electronic circuit for effectuating the operation of appropriate apparatus in response to received radio code signals.

Although my invention has general application to visual indicators, recorders, electronic printers, facsimile receivers, and the like, I shall describe the invention with specific reference to a teleprinter. Those skilled in this art will have no difficulty in applying the principles and circuits herein described to such other devices.

In teleprinter systems of the type to which this invention may be applied, it is customary to transmit coded radio waves of two different frequencies in alternate sequence, each succession of wave pulses having a precise time duration measured, generally, in milli-seconds. Various characters, figures, punctuation marks, etc., are represented by individual combinations of the two wave pulses in accordance with the standard radiotype code and these coded sequences are translated at the receiver-converter into direct current pulses of corresponding time duration. Such direct current pulses are employed to set up an electromagnetic selector mechanism preparatory to imprinting of the corresponding character or number on a sheet of paper.

While a single frequency system operating as a simple "on-off" code arrangement may be employed for teleprinting purposes, it has been found that random electrical and/or radio energy disturbances, either external to or within the receiver-converter, produce spurious operations of the printing mechanism. Consequently, present accepted practice employs the two frequency system, said frequencies being in the radio spectrum, say 2 megacycles, with a frequency separation of 850 cycles. It is common practice to designate one of the frequencies as the Space signal and the other as the Mark signal. Thus, the transmission of the letter "A" comprises: a Space signal (2 megacycles) for 22 milliseconds, followed by a Mark signal (2 mc.+850 cycles) for 44 milli-seconds, followed by a Space signal (2 mc.) for 66 milli-seconds, followed by a Mark signal (2 mc.+850 cycles) for 31 milli-seconds.

Present teleprinter circuits empliy a discriminator type of demodulator to distinguish between the Mark and Space signals, whereby only the Mark signal will be effective to cause actuation of the selector magnet mechanism in the form of D.-C. current pulses. These D.-C.

pulses, which vary in time duration and time spacing, set up the selector mechanism for the power operation of the type bar corresponding to the particular code character received. However, the discriminator demodulator arrangement is subject to numerous serious disadvantages which may be summarized as follows:

1. A discriminator demodulator usually requires the use of a D.-C. amplifier for increasing the gain after the discriminating function and it is well known that D.-C. amplifiers are, in general, difficult to design and unstable in operation.

2. A discriminator circuit, of the type now in general use, does not provide equal positive and negative voltage pulses for operation of the selector mechanism in the event the signal frequencies, or the receiver oscillator, drift from the mean frequency value. This necessitates recourse to automatic frequency controls, or manual frequency control under constant supervision by the operator.

3. A discriminator circuit is susceptible to spurious operations by extraneous disturbances and is vulnerable to adjacent channel interference unless very sharp cut-off filters are employed. Unfortunately, sharp cut-off filters restrict the amount of frequency drift which can be tolerated to a very narrow range. Consequently, it is necessary to employ a very active automatic frequency control and it is well known that very often an interfering signal will take over control of the automatic frequency control circuit causing the wanted signal to be lost entirely.

The present invention is directed to a novel carrier frequency shift converter circuit disposed between the radio signal receiver and the electro-magnetic selector mechanism, which converter operates on a phase shifting and heterodyning principle to overcome the objections to, and disadvantages in, present teleprinter devices.

An object of this invention is the provision of a receiver-converter system inherently capable of highly reliable operation and one in which the operation of the mechanical translating apparatus is unaffected by extraneous electrical disturbances, inter-channel interference or relatively wide deviations in the frequency of the received signals.

An object of this invention is the provision of a radio receiver-converter employing a phase shifter arrangement for distinguishing between Mark and Space signals, whereby extraneous disturbances are automatically balanced out of the circuit controlling operation of the mechanical translating apparatus.

An object of this invention is the provision of a novel electronic circuit for teleprinters, wherein stability of operation is obtained by employing A.-C. amplifiers.

An object of this invention is the provision of an electronic system for operating electromechanical translating apparatus in response to radio signal waves of two different frequencies and comprising a radio receiver, means for translating the received signal waves into two intermediate frequencies, means for demodulating the two intermediate frequency signal waves, means for channeling the demodulated waves into separate channels, means for rendering ineffective the wave pulses in one of the channels, and means for effecting actuation of the electromechanical translating apparatus in accordance with the wave pulses in the other channel.

An object of this invention is the provision of a translating system for operation of a teleprinter, or the like, in accordance with transmitted Mark and Space signals of two different frequencies, said system comprising: a radio receiver converting the transmitted signals to corresponding pulses of intermediate frequency, a first balanced demodulator, a second balanced demodulator, circuit elements impressing the intermediate frequency pulses upon the input of each demodulator, an oscillator tuned to the mean frequency of said intermediate frequency pulses, circuit elements for impressing the oscillator output directly upon the control grids of the first demodulator, whereby the output voltage of the demodulator is an audio frequency pulse, a 90 degree phase shifter connected between the oscillator output and the control grids of the second demodulator, whereby the audio frequency output pulse of the second demodulator is displaced 90 degrees from the output of the first demodulator, individual wide-band phase shifters for splitting the audio frequency voltage output of each demodulator into two components displaced by 90 degrees, means for combining the quadrature voltage output components of both said wide-band phase shifters to produce separate wave pulses corresponding to the received Mark and Space signals, means for converting the separate wave pulses into positive and negative D.-C. pulses respectively, and means for effectuating the operation of the teleprinter selector magnet only by the positive D.-C. pulses.

These and other objects and advantages will be apparent from the following detailed description of a practical embodiment of the invention when taken with the accompanying drawings. The drawings are for purposes of illustration and are not to be construed as defining the scope or limits of the invention, reference being had for the latter purpose to the appended claims.

In the drawings wherein like reference characters denote like parts in the several views.

Figure 3A:
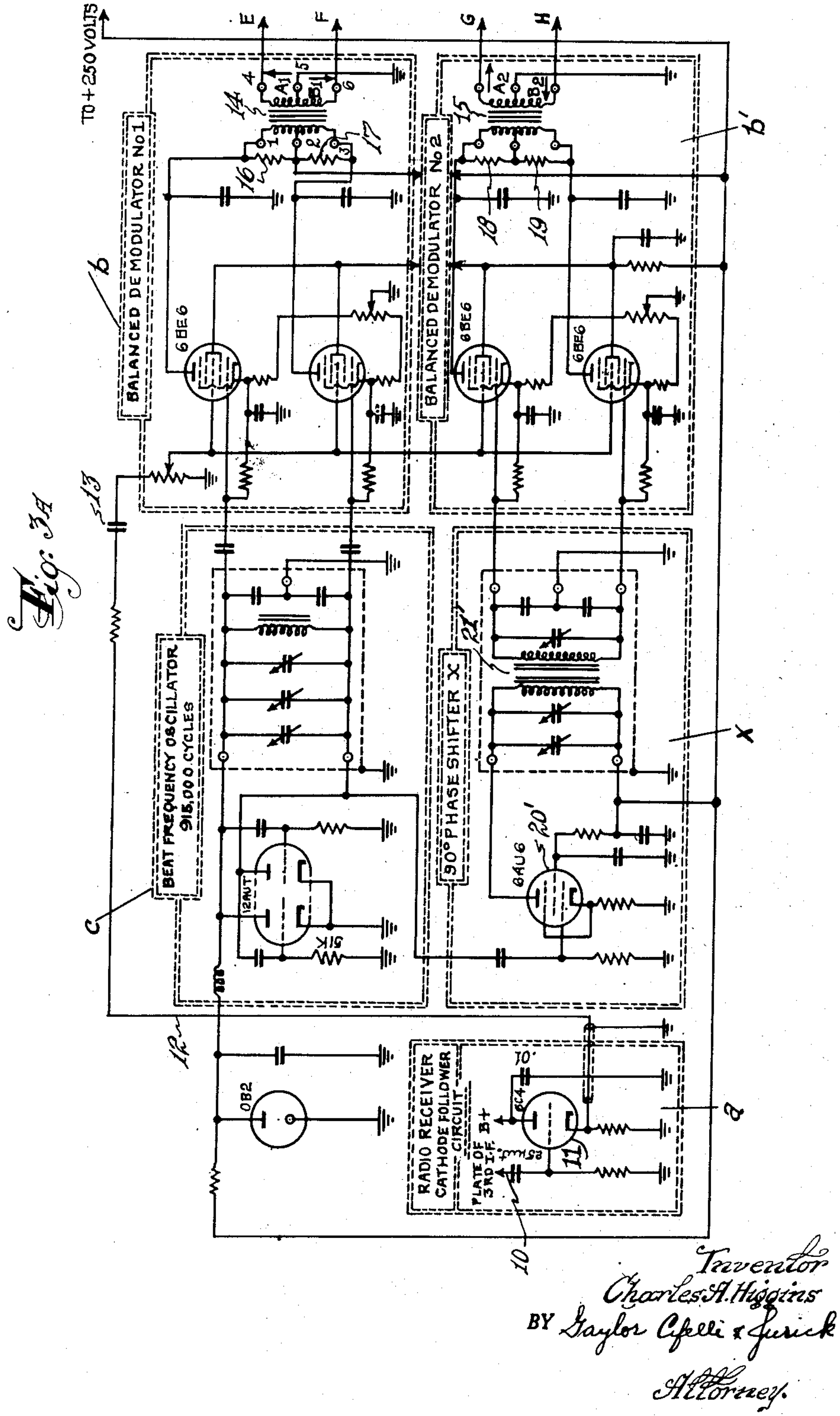

Figures 3A, B and C comprise the circuit diagram of my frequency shift converter.

The present invention will be described with specific reference to established teleprinter channels, that is, one wherein the transmitted code comprises two frequencies differing by 850 cycles, although my circuit will operate equally well for frequency separations of from 100 to several thousand cycles. It will be assumed the Space signal has a frequency of 2 megacycles (mc.) and the Mark signal 2 mc.+850 cycles. These frequencies are heterodyned down to an intermediate frequency in the radio receiver and my novel converter is adapted to convert the Mark signal into a direct current pulse which energizes the selector magnet mechanism in the printer, and to balance out the Space signal so that this signal has no effect whatsoever upon the selector mechanism.

If the radio frequency oscillator of the receiver is tuned to 1,085,425 cycles it will beat with the incoming Mark signal having a frequency of 2,000,850 cycles to produce an intermediate frequency (I. F.) of 915,425 cycles. Likewise, an incoming Space signal having a frequency of 2,000,000 cycles will beat with the oscillator frequency of 1,085,425 cycles, resulting in an I. F. of 914,575 cycles. If the I. F. amplifier of the receiver has a mean frequency of 915,000 cycles, which is typical of present receivers, it will easily pass frequencies several kilocycles above and below the mean frequency by reason of its wide band-pass characteristic. Thus the Mark signal results in a 915,425 cycle wave and the Space signal results in a 914,575 cycle wave, in the I. F. amplifier. It is here again pointed out that these intermediate frequencies appear in sequence, that is, one at a time, depending upon whether a Mark or Space signal is received.

Figure 1:
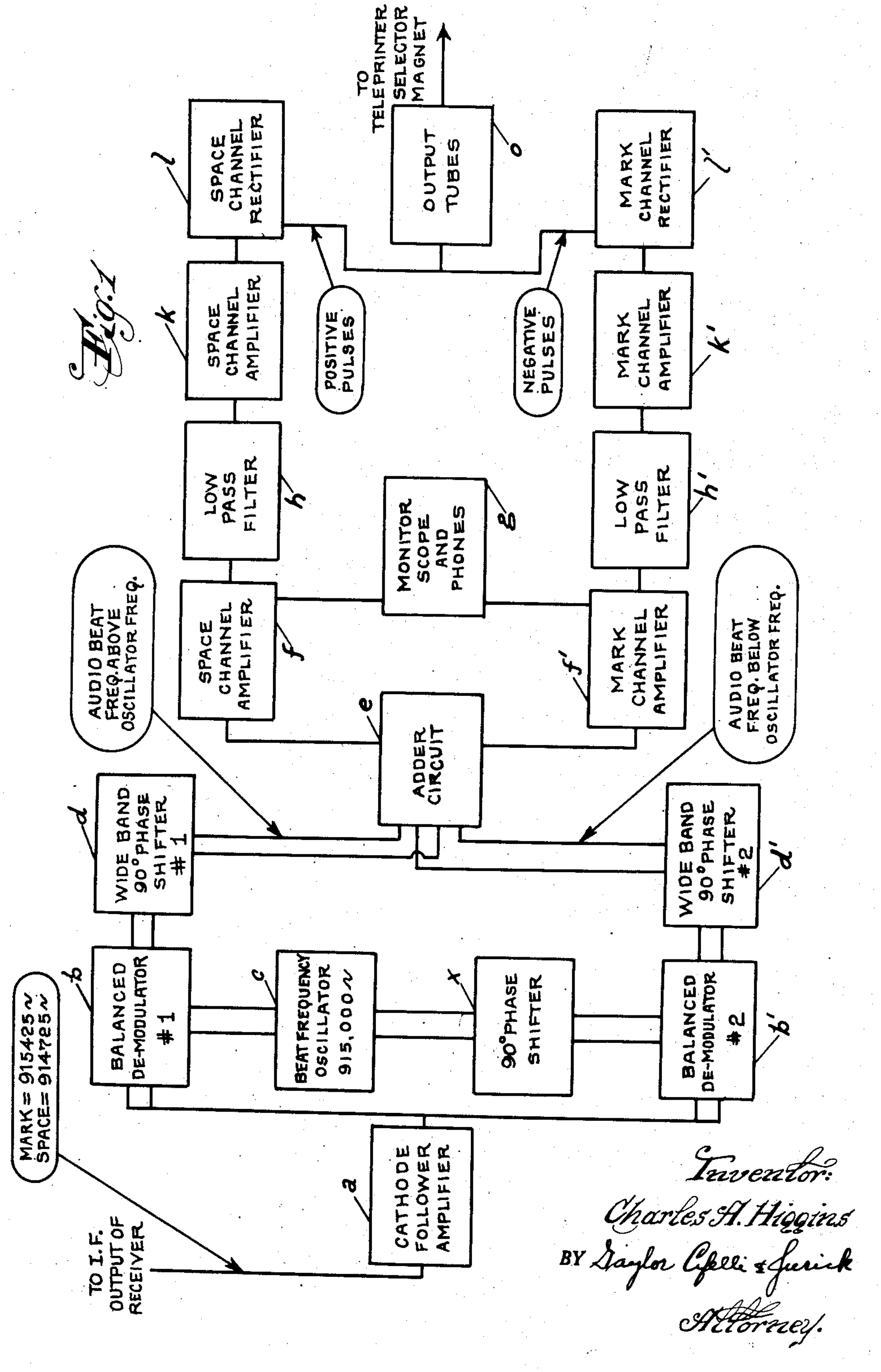
Figure 1 is a block diagram which identifies the various elements of the eelctronic circuit and illustrates the functional relationship between them.

Referring now to the block diagram, Figure 1, the intermediate frequency outputs of the receiver are amplified by a Cathode Follower Amplifier, *a*, whose outputs, in turn, are fed, in phase, to the control grids of two Balanced Demodulators #1 and #2, identified by the letters *b*, *b'*, respectively, in the drawing. A Beat Frequency Oscillator *c*, is set to oscillate at the mean intermediate frequency, namely, 915,000 cycles and the oscillator output is fed directly to Demodulator #1 by means of the two leads carrying voltages that are exactly 180 degrees out of phase with each other. Thus, the incoming frequency, say a Mark signal of 915,425 cycles, beats with the oscillator frequency (915,000 cycles) to produce an audio frequency output of 425 cycles from Demodulator #1. Inasmuch as the demodulator is of the balanced circuit type two 425 cycle waves will appear across its two output leads, said waves being exactly 180 degrees out of phase with each other.

The output of the Beat Frequency Oscillator is likewise impressed upon Demodulator #2 but through the 90° Phase Shifter X. Thus, the two leads from the Phase Shifter X carry voltages that are 180 degrees out of phase with each other and both of these voltages are 90 degrees out of phase with those fed to Demodulator #1. This produces, in Demodulator #2, a 425 cycle audio frequency output which is, in all respects, 90 degrees out of phase with the 425 cycle audio frequency output of Demodulator #1.

It will be noted that the Demodulators #1 and 2 are connected to Wide Band, 90°, Phase Shifters #1 and 2, identified by the letters *d*, *d'*, respectively. These phase shifters comprise rather complex, individual networks each capable of taking a single audio frequency voltage, in the range of approximately 50 to 1000 cycles, and deriving therefrom two voltage components that are very nearly 90 degrees out of phase with each other. The dual, output voltages of the individual Phase Shifters are combined in the Adder Circuit, *e*, which, by reason of the fixed and exact phase relationships, provides an automatic separation of the Mark and Space signals received by the receiver. This function of the Phase Shifters can best be described by reference to vector diagrams.

Figure 2:
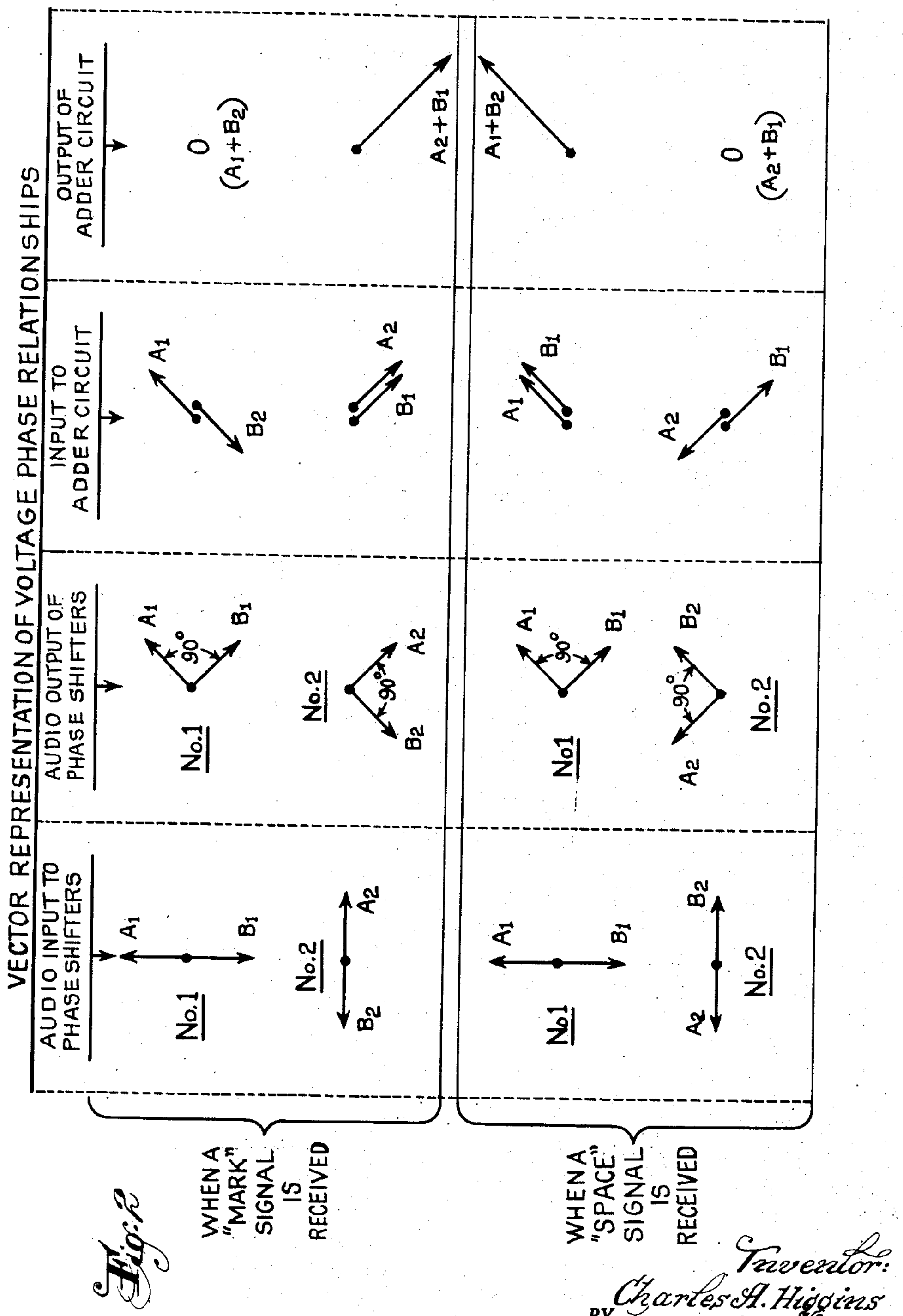
Figure 2 is a vectoral representation illustrating the phase relationship between the voltage outputs of the demodulators and phase shifters when a Mark and Space signal is received.

Referring now to the upper portion of Figure 2, there is shown a qualitative vector representation of the phase relationships of the various voltages when a Mark signal is applied to the network, that is, when the incoming frequency is higher than that of the Beat Frequency Oscillator. As stated herein above, the Demodulators are of the balanced circuit type, whereby two voltages appear across the output of each demodulator and the dual voltages of each demodulator are exactly 180 degrees out of phase with each other. Such voltages constitute the inputs to the Wide Band 90° Phase Shifters. However, by reason of the 90° Phase Shifter X, the voltage inputs to the Phase Shifter No. 2 leads those applied to the Phase Shifter No. 1 by exactly 90 degrees. Conquently, the vectors $A_1$, $B_1$ represent the two audio input voltages fed to the Wide Band Phase Shifter No. 1, and the vectors $B_2$, $A_2$ represent the voltage input to the Wide Band Phase Shifter No. 2.

Each Phase Shifter shifts the phase relationship of its input voltages from the original 180° (input) to 90° (output), as illustrated in the second column of Figure 2. It is apparent the output voltage $A_1$ of the Phase Shifter No. 1 is exactly 180° out of phase with the output voltage $B_2$ of the Phase Shifter No. 2, and that the output voltages $B_1$ and $A_2$ of the No. 1 and No. 2 Phase Shifters, respectively, are exactly in phase with each other. These output voltages constitute the input to the Adder Circuit (as shown in the third column). The resultant voltage output of the Adder Circuit is shown in the fourth column, it being apparent the voltages $A_1$ and $B_2$ cancel each other and the voltages $B_1$ and $A_2$ are directly additive. Thus, when a Mark signal is applied to the network the voltage output of the Adder Circuit has a magnitude twice that of the individual voltages applied to the Phase Shifters and such output voltage has a direction as shown in the fourth column of Figure 2.

The lower portion of Figure 2 is a similar representation of the phase relationships of the various voltages when a Space signal is applied to the network, that is, when the incoming signal has a frequency lower than that of the Beat Frequency Oscillator. In this case the voltage outputs $B_1$ and $A_2$ of the No. 1 and No. 2 Phase Shifters, respectively, cancel out and the output of the Adder Circuit comprises the in-phase voltages $A_1$ and $B_2$ having the direction shown. It may here be pointed out that the output voltages of the Adder Circuit, representing the individually-applied "Mark" and "Space" signal to the network, are in quadrature.

Referring again to Figure 1, the instantaneous voltage output of the Adder Circuit has a magnitude twice that of the instantaneous input voltages applied thereto by either of the Wide Band 90° Phase Shifters and the voltage output corresponding to a Mark signal is 90° out of phase with that corresponding to a Space signal. These voltages appear as separate and distinct pulses having a time duration corresponding to that of the received code pulses. These quadrature, successive voltage pulses are fed, selectively, by the Adder Circuit, to the appropriate channel. Specifically, the Mark signal voltage is fed to the Mark Channel Amplifier, *f′*; and the Space signal voltage is fed to the Space Channel Amplifier, *f*. It is here pointed out that, by virtue of the wide band characteristics of the Phase Shifters No. 1 and No. 2, a 90° phase shift is maintained over a wide range of audio frequencies, thereby accommodating appreciable drift of the transmitted frequencies or drift of the receiver oscillator.

As shown in the block diagram of Figure 1, I provide means, *g*, for monitoring both channels singly or simultaneously by head phones, or by an oscilloscope, for the purpose of properly tuning the radio receiver.

Individual Low Pass Filters, *h′*, *h*, are inserted into the Mark and Space channels, respectively, to increase the selectivity of the audio channels, thereby reducing, or eliminating, adjacent channel radio interference. The Low Pass Filters pass audio frequencies from D.-C. to 1,200 cycles and attenuation of more than 40 decibels, with respect to any frequencies above 1,600 cycles, is provided.

The outputs of the individual Low Pass Filters are amplified by the separate Mark and Space Channel Amplifiers, *k′*, *k*, respectively, and converted to D.-C. pulses by the individual Space and Mark Channel Rectifiers, *l*, *l′*, respectively. Such D.-C. pulses are then fed to the Output Tubes, *o*, and the circuit is so arranged that the Mark channel pulses produce positive impulses which cause the Output Tubes to become conducting, thereby energizing the teleprinter selector magnet. On the other hand, the Space channel pulses produce negative impulses that cut off the Output Tubes, thereby deenergizing the selector magnet. The specific operation of the elector magnet in response to the coded impulses, and the subsequent electro-magnetic actuation of the appropriate printing type bar are well known and form no part of the present invention and, therefore, such mechanisms are neither shown nor described. Suffice to say that the selector magnet is in the output circuit of the Output Tubes and, therefore, is energized in precise accordance with the positive impulses impressed upon such Output Tubes, said positive pulses corresponding precisely in time duration and spacing to the received Mark signals.

Figure 3B:
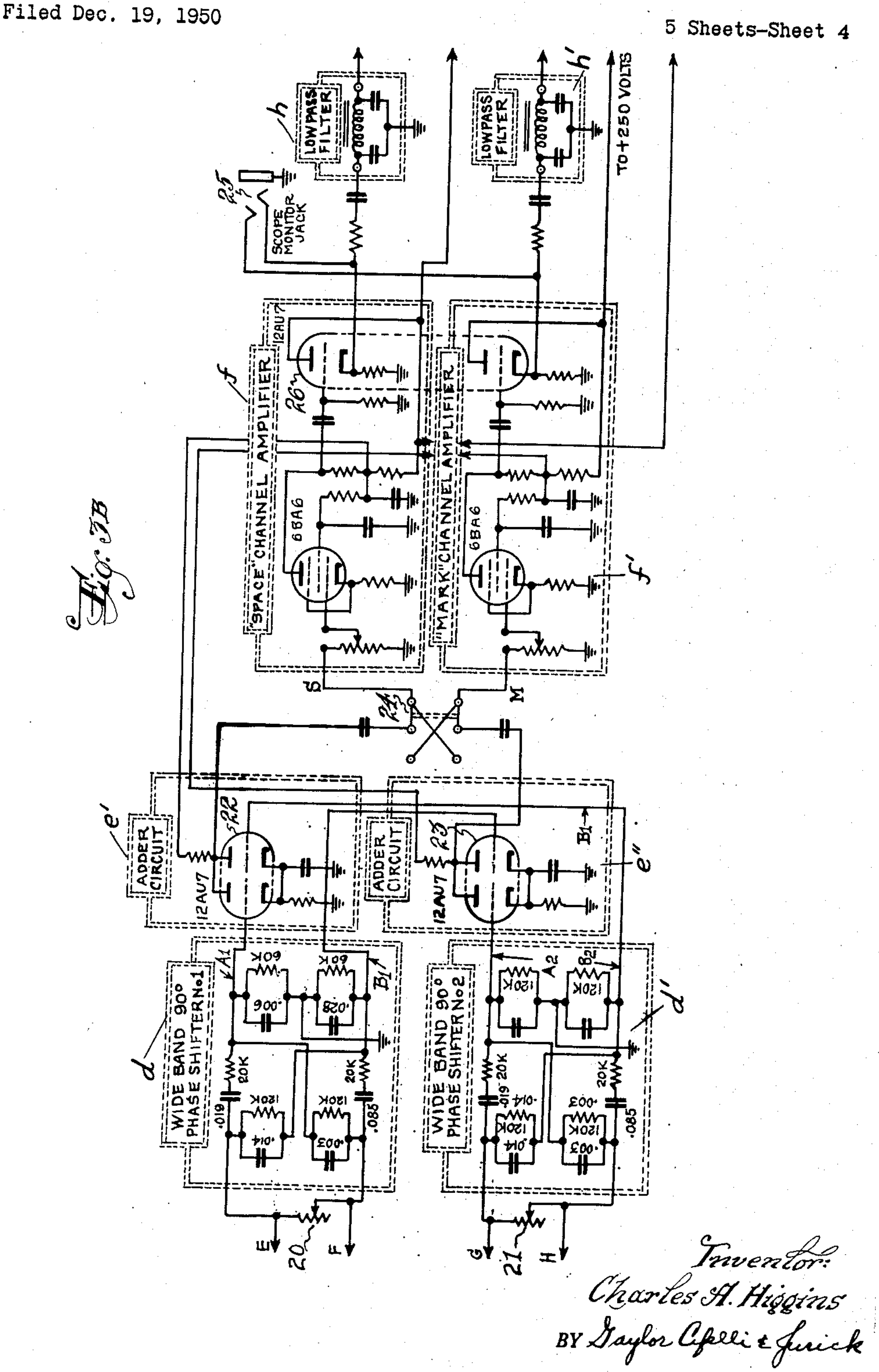
Figure 3C:
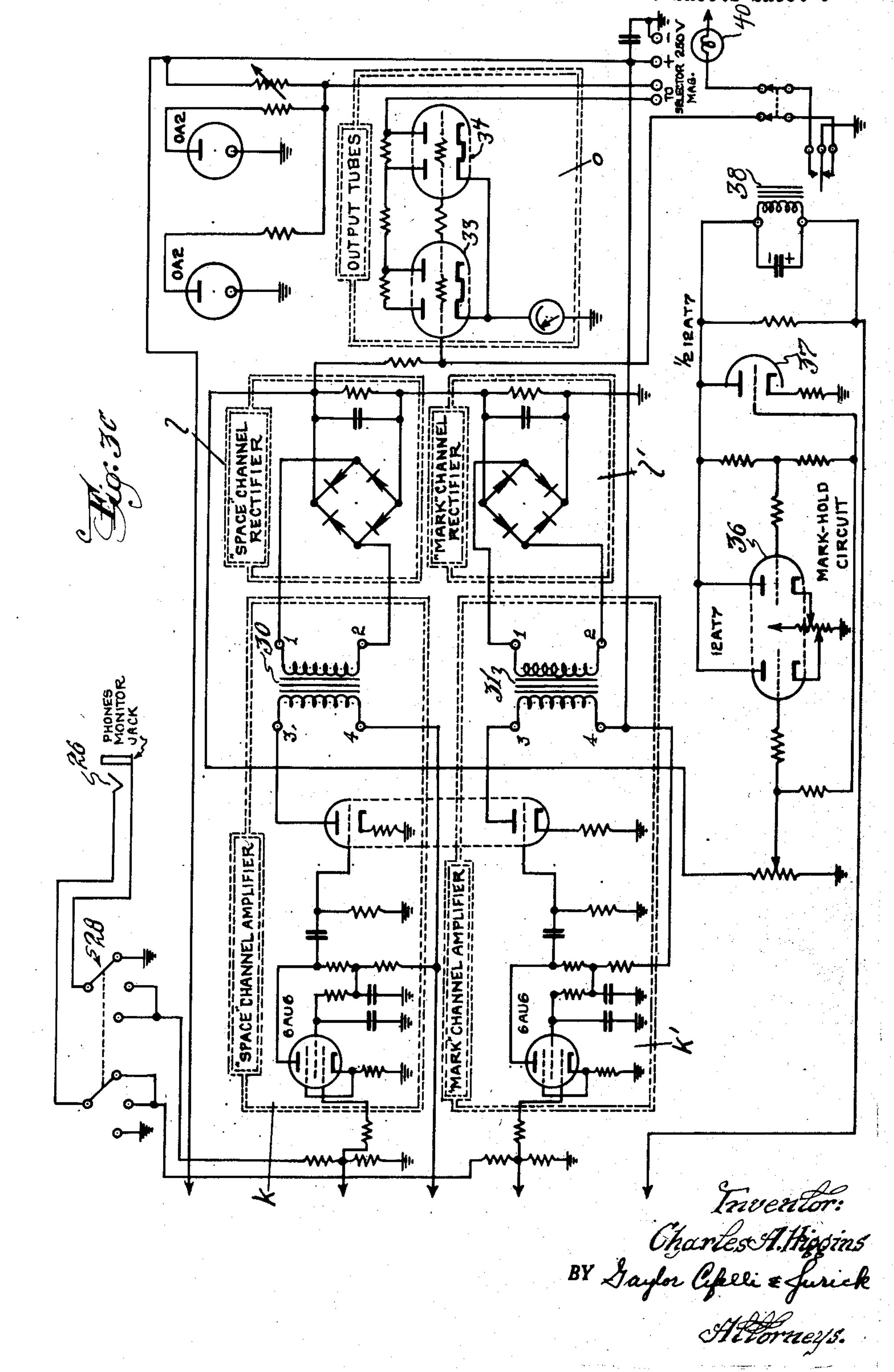

Figures 3A to 3C, taken together, constitute a wiring diagram of a frequency shift converter network made in accordance with this invention and suitable for a teleprinter. In these wiring diagrams the components identified in the block diagram of Figure 1 are correspondingly blocked off, by the double-row dotted lines, and similarly identified.

Referring now specifically to Figure 3A, the incoming signal is taken from the 3rd I. F. stage of the radio receiver through the lead 10, such signal being heterodyned down to an intermediate frequency in the receiver proper, the latter not shown in the diagram. As previously stated, the oscillator of the receiver is tuned to 1,085,425 cycles and, therefore, beats against an incoming Mark signal, having a frequency of 2,000,850 cycles, to produce an intermediate frequency of 915,425 cycles. Likewise, an incoming Space signal produces a beat frequency of 914,575 cycles. Consequently, the successive, incoming Mark and Space signals result in 915,425 and 914,575 cycle waves in the lead 10. These waves are amplified by the Cathode Follower Circuit, *a*, in the tube 11, preferably a 6C4 type, which derives its negligible filament and plate currents from the receiver proper. The grid of the 6C4 tube connects to the plate of the 3rd I. F. transformer of the receiver, the other side of which is grounded.

The I. F. signal from the 6C4 tube is applied to the parallel control grids of the 6BE6 tubes in the Balanced Demodulators No. 1 and No. 2 through the lead 12 and the coupling condenser 13. Connected to the plates of each pair of 6BE6 tubes are small stepdown transformers 14, 15 that provide a low source impedance with which to feed the following networks. The swamping resistors 16, 17, 18 and 19, connected across each half of the transformer primaries prevent resonances in the transformers and the variable resistors 20, 21, connected across the transformer secondaries may be adjusted to equalize the outputs of the two Demodulators.

The output of the Beat Frequency Oscillator, *c*, tuned to 915,000 cycles, is fed directly to the paired 6BE6 tubes of Demodulator No. 1 but it will be noted the oscillator voltages are fed to each such tube in phase opposition. In the case of Demodulator No. 2, however, the oscillator voltages are fed to the paired 6BE6 tubes through the 90° Phase Shifter X. A 6AU6 buffer tube 20′ is inserted between the Beat Frequency Oscillator and the phase-shifting network in order to prevent any reaction on the frequency of the oscillator caused by tuning the secondary of the phase-shifting transformer 21′. The desired 90 degree phase shift is obtained by tuning the network connected to the 6AU6 buffer tube and when such circuit is at resonance the phase shift will be correct.

It will now be apparent that the incoming frequency, say a Mark signal of 915,425 cycles, beats with the frequency of the Beat Frequency Oscillator to produce an audio frequency signal of 425 cycles in the output transformers 14, 15 of the Demodulators No. 1 and No. 2, respectively. The Demodulators being of the balanced circuit type, two 425 cycle voltages will appear across the secondary windings of the transformers, such voltages being 180 degrees out of phase with each other. These voltage outputs of the individual Demodulators are represented by the vector arrows $A_1$ and $B_1$ (associated with the transformer 14) and $A_2$ and $B_2$ (associated with the transformer 15), it being emphasized that the dual voltages of each Demodulator are 180 degrees out of phase with each other, and 90 degrees out of phase with those of the other Demodulator (see also Figure 2). These demodulator output voltages are fed to the two Wide Band 90° Phase Shifters through the leads E, F, G, and H, which leads tie in the circuits of Figures 3A and 3B.

Referring now to Figure 3B, it will be noted that two, separate Wide Band Phase Shifters *d*, *d′*, are employed in order to maintain the necessary 90 degree relationship between the output voltages of the Demodulators for, although these output voltages of the Demodulators are 90 degrees apart, the relative phase relationship of these voltages does not necessarily bear a fixed relationship with the input signal voltage. Each Wide Band Phase Shifter serves as a means for deriving, from a single audio-frequency voltage, two new voltages of the same frequency but with the phase angle between the new voltages held constant over a wide frequency range. Each derived voltage has an amplitude characteristic linearly variable with the amplitude of the input voltage independently of the frequency. Such results are obtained, within each Wide Band Phase Shifter, by two networks whose phase angle increases substantially linearly with the logarithm of the frequency and, when the networks are properly matched, the phase difference between them remains nearly constant over a wide range of frequencies. Although the absolute values of the components in these phase-shift networks are not important, the mathematical relationships between the resistors and the capacitors must be accurately established to maintain the desired 90 degree phase shift. The specific values for these components are given in the wiring diagram to produce a 90 degree phase shift for frequencies between 95 and 500 cycles. However, these components could just as well be given different absolute values to alter the frequency spread from 75 to 450 cycles, without adversely affecting the operation of my device.

The vector arrows $A_1$, $B_1$ and $A_2$, $B_2$, associated with each of the Wide Band Phase Shifters, indicate the phase relationships of the derived voltages constituting the outputs of such phase shifters. These voltages are impressed upon the control grids of the type 12AU7 tubes in the Adder Circuits No. 1 and No. 2, identified by the letters *e′*, *e″*. It will be noted that the voltage component $A_1$ of Phase Shifter No. 1, and the voltage component $B_2$ of the Phase Shifter No. 2, are each impressed upon the control grids of the tube 22 in the Adder Circuit No. 1. Inasmuch as these voltage components are of equal magnitude and exactly 180 degrees out of phase with each other, the total output of the tube 22 is zero. Similarly, the voltage components $B_1$ and $A_2$ of the individual Phase Shifters No. 1 and No. 2, respectively, are impressed upon the grids of the tube 23 in Adder Circuit No. 2. Since these voltage components are in phase and of equal magnitude they produce, individually, equal and in phase outputs in the tube. Consequently, while the voltage output of the tube 22 is zero, that of the tube 23 is twice that which would obtain as a result of the individual voltage components $B_1$ and $A_2$. Thus, when a Mark signal is received by the radio receiver an amplified voltage pulse appears across the lead M and ground, and no voltage appears across the lead S and ground. Conversely, as will be apparent from the vector representations of Figure 2, a received Space signal results in an amplified voltage pulse appearing across the lead S and ground and no voltage across the lead M and ground. There is thus obtained a complete separation of voltages each corresponding, in a mutually-exclusive sense, to the received Mark or Space signals, each having a precise time duration equal to that of the Mark-Space radio code, and the phase angle between them is 90 degrees.

My frequency shift conversion network permits the use of conventional audio frequency amplifiers for increasing the gain in the various circuits while the conventional type of converter employing a discriminator type of demodulator usually requires D. C. amplifiers for increasing the gain after the discriminator. It may also here be pointed out that the above-described circuit produces constant and equal voltages as long as the signal frequency does not shift beyond a point that would carry both intermediate frequencies (Mark and Space) over on one side of the beat oscillator frequency setting.

The successive, quadrature voltage pulses from the two Adder Circuits are impressed upon the inputs of the respective Space and Mark Channel Amplifiers *f, f'*, through the reversing switch 24. As shown in the diagram, separate Low Pass Filters *h, h'*, are inserted in the outputs of the amplifiers to increase the selectivity of the audio channels and, thereby, eliminate adjacent channel interference. These filters have a rather sharp cut-off characteristic and are designed to pass audio-frequencies from D.-C. to 1,200 cycles.

It is important that the networks of the two channels (Mark and Space) behave as nearly alike as possible and to check the operation of the channels I provide means for connecting an oscilloscope into each or both networks. The scope monitor jack 25, provided for this purpose, is connected to the output circuits of the type 12AU7 tubes in the Channel Amplifiers, whereby the horizontal and vertical amplifiers of the oscilloscope can be connected to the amplifier outputs to produce substantially horizontal and vertical traces when the two channels are operating uniformly.

My novel converter circuit affords another important advantage in that the radio receiver may be tuned by ear through the use of head phones. As shown in Figure 3C, the phone's monitor jack 26 is connected through the double-blade switch 28 across the Low Pass Filters (see Figure 3B). When the coded radio signals are received in the radio receiver the audio Mark and Space frequencies at the Low Pass Filter output are of the same frequency and sound as a continuous 425 cycle note for an 850 cycle spread, or difference, in the Mark and Space signals. A substantial frequency drift in the transmitted code signals is, therefore, readily apparent to the operator. Alternatively, a suitable frequency indicator can be used in place of the ear phones.

As shown in Figure 3C, the individual Space and Mark Channel impulses are further amplified by additional A.-C. amplifiers *k, k*, to provide a desired level of output voltage in the respective output transformers 30, 31. The voltage pulses appearing across the secondary windings of the output transformers 30, 31 are individually rectified by the respective Space and Mark Channel Rectifiers, producing D.-C. voltage pulses that are impressed upon the control grids of the Output Tubes 33 and 34, said tubes being normally biased to prevent cathode conduction. Specifically, the Mark channel pulses produce positive impulses which, when impressed upon the grids of the output tubes, cause the Output Tubes to become conductive, thereby producing correspondingly-timed current pulses through the teleprinter selector magnet that is connected to the terminals so marked. On the other hand, the Space channel pulses produce negative impulses on the grids of the output tubes, thereby blocking conduction through the tubes and deenergizing the selector magnet. The specific operation of the selector magnet of a teleprinter, to set up and operate type bars carrying the characters corresponding to those of the received signal pulses, is well known and it is not shown nor described in this application.

It will be noted that the D.-C. voltage pulses from the Rectifiers *l, l'* are also impressed upon a Mark Hold Circuit comprising the tubes 36, 37 and the relay 38. The function of the Mark Hold Circuit is to provide, automatically, a means of biasing the Output Tubes 33, 34 in such manner as to energize the selector magnet of a teleprinter, or similar device, during no signal, or standby, periods. Such a device is necessary to prevent teleprinters from running "open" during lack of signal frequencies. Relay 38, when unenergized, closes a circuit connected from the grids of Output Tubes 33, 34 to "ground." The cathodes of said tubes are connected to "ground" through a current measuring instrument. Therefore, when the relay contacts close in the unenergized position, the grids of vacuum tubes 33, 34 are at the same potential as the cathodes, causing plate current to flow thereby energizing the selector magnet. The operation of relay 38 depends upon the conductivity of the tube 36. Both halves of the tube 36 are biased to prevent plate current flow when no signal frequencies exist, under which condition relay 38 is unenergized allowing the grounded contact to close the circuit between the grids of the Output Tubes to ground. A Mark signal pulse will cause a positive potential to be placed directly on the grid of one of the triodes in the tube 36. This causes plate current to flow through the winding of the relay 38 resulting in a separation of the relay contacts grounding the Output Tube grids and a closure of the relay contacts for energization of the lamp 40. Such lamp provides a visual indication when a signal is being received. A Space signal performs similarly except that negative pulses from the Rectifiers must be inverted into positive pulses in the tube 37. The relay 38 has a slow time constant by reason of the capacitor connected across its winding and, therefore, will not respond to short noise pulses.

Having now described my invention with specific reference to a teleprinter those skilled in this art will have no difficulty in applying the converter network for other specific purposes such as electronic printers, facsimile receivers and the like. Broadly, the received, coded radio waves having two different frequencies, predetermined time-durations, and received in an alternate sequence, are converted to corresponding and definite pulses having a specific phase displacement and the resulting such pulses may be rectified (as herein described) or otherwise employed for the operation of various devices for specific purposes. The intrinsic advantages of my converter network may be summarized as follows:

1—the system will accommodate appreciable drifting of the transmitted frequencis or of the receiver-oscillator;

2—adjacent radio channel interference is eliminated in most instances and, in any event, is reduced to negligibility from a practical, operation standpoint;

3—A.-C. amplifiers are employed as distinguished from D.-C. amplifiers required in present systems;

4—the resulting voltage pulses in the converter output are of equal magnitude even though the signal frequencies, or the receiver-oscillator, drift off from the proper frequency;

5—the system will tolerate higher noise levels because of increased effective selectivity due to the tendency to balance out the extraneous noise in the same manner as it distinguishes between Mark and Space signals.

From the above description of my invention various changes and variations in the circuit for specific purposes will present themselves to those skilled in this art without thereby departing from the scope and spirit of the invention as set forth in the following claims.

I claim:

1. A translating system for teleprinters of the type including a selector magnet and operated in accordance with alternately-transmitted radio wave pulses of two different frequencies, said system comprising a radio receiver including means converting the received radio pulses into corresponding pulses of intermediate frequency, a pair of balanced demodulators responsive to the intermediate frequency pulses, means establishing in the output of each balanced demodulator alternate audio frequency pulses corresponding to the received radio wave pulses, means shifting the phase of the audio frequency pulses in the output of one demodulator 90 degrees with respect to the similar output of the other demodulator, means providing two phase quadrature voltage components from each audio frequency pulse in the demodulator outputs, means combining the four quadrature voltage components into a resultant voltage pulse, means segregating the resultant voltage pulses into separate electrical channels on the basis of phase difference, means converting the resultant voltage pulses in each channel into direct current pulses, and control means for operating the selector magnet of the teleprinter, said control means being effective to cause operation of the selector magnet only in response to the direct current pulses in one of said electrical channels.

2. The invention as recited in claim 1, wherein the means shifting the phase of the audio frequency pulses in the output of one demodulator 90 degrees with respect to the similar output of the other demodulator comprises an oscillator tuned to a frequency midway between the frequencies of the intermediate frequency pulses, means impressing the output of the oscillator directly upon one of the balanced demodulators, and means impressing the output of the oscillator upon the other balanced demodulator through a 90 degree phase shifter.

3. The invention as recited in claim 1, wherein the means providing two phase quadrature voltage components from each audio-frequency pulse in the demodulator outputs comprises a pair of wide band 90 degree phase shifters connected one each to a demodulator output.

4. The invention as recited in claim 1, wherein the means combining the four quadrature voltage components into a resultant voltage pulse comprises a pair of dual vacuum tubes with each of the control grids independently biased by one of the quadrature voltage components.

5. A translating system for teleprinters of the type having a selector magnet operated in accordance with alternately transmitted radio wave pulses of two different frequencies, said system comprising a radio receiver including means heterodyning the received radio wave pulses down to corresponding pulses of intermediate frequency, a pair of balanced demodulators, means impressing the intermediate frequency pulses upon the control grids of both balanced demodulators, an oscillator tuned to a frequency midway between the frequencies of the intermediate frequency pulses, means impressing the oscillator output directly upon the input of one of the balanced demodulators, a 90 degree phase shifter connected between the oscillator output and the input of the other balanced demodulator, a pair of wide band 90 degree phase shifters individually connected to the output of each demodulator, means combining the outputs of both wide band phase shifters to produce resultant voltage pulses corresponding to the alternately received radio wave pulses, means segregating the resultant voltage pulses into separate electrical channels on the basis of phase difference, a first pair of alternating current amplifiers individually amplifying the voltage pulses in each channel, individual low pass filters connected in the outputs of such amplifiers, a second pair of amplifiers individually responsive to the outputs of the low pass filters, individual rectifiers rectifying the pulse outputs of said second amplifiers, and control means for energizing the selector magnet of the teleprinter, said control means energizing the selector magnet only in response to direct current pulses of one of the said rectifiers.

6. The invention as recited in claim 5 in combination with a visual indicator and means controlling the energization of said indicator, said last means being responsive to the pulse outputs of the rectifiers.

7. The invention as recited in claim 5 including automatic means energizing the selector magnet when no wave pulses are received by the receiver.

8. The invention as recited in claim 5 including means adapted for selective connection of an oscilloscope into the outputs of the said first pair of alternating current amplifiers, and means adapted for selective connection of ear phones into the outputs of the said low pass filters.

CHARLES A. HIGGINS.

References Cited in the file of this patent

UNITED STATES PATENTS

| Number | Name | Date |
|---|---|---|
| 1,744,044 | Green | Jan. 21, 1930 |
| 2,044,745 | Hansell | June 16, 1936 |
| 2,070,418 | Beverage | Feb. 9, 1937 |
| 2,494,323 | Weber | Jan. 10, 1950 |

OTHER REFERENCES

Electronics for December 1945, pages 150 and 151.